(12) United States Patent
Wang et al.

(10) Patent No.: US 12,050,634 B2
(45) Date of Patent: Jul. 30, 2024

(54) METHOD AND APPARATUS FOR DISTRIBUTING CONTENT ACROSS PLATFORMS, DEVICE AND STORAGE MEDIUM

(71) Applicant: Beijing Baidu Netcom Science Technology Co., Ltd., Beijing (CN)

(72) Inventors: Weihua Wang, Beijing (CN); Tingting Shi, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 142 days.

(21) Appl. No.: 17/650,559

(22) Filed: Feb. 10, 2022

(65) Prior Publication Data

US 2022/0164377 A1   May 26, 2022

(30) Foreign Application Priority Data

Jun. 17, 2021 (CN) .......................... 202110672873.7

(51) Int. Cl.
G06F 16/335 (2019.01)
G06F 16/35 (2019.01)

(52) U.S. Cl.
CPC .......... G06F 16/335 (2019.01); G06F 16/355 (2019.01)

(58) Field of Classification Search
CPC .............................. G06F 16/335; G06F 16/355
USPC .......................................................... 709/203
See application file for complete search history.

(56) References Cited

U.S. PATENT DOCUMENTS

| | | | | |
|---|---|---|---|---|
| 2007/0112948 A1* | 5/2007 | Uhlik | .................. | H04L 12/1446 709/223 |
| 2010/0049817 A1* | 2/2010 | Xu | .......................... | H04L 51/56 709/206 |
| 2023/0208798 A1* | 6/2023 | Green | ................. | G06F 16/9538 709/204 |

FOREIGN PATENT DOCUMENTS

| | | |
|---|---|---|
| CN | 102760144 A | 10/2012 |
| CN | 107404512 | 11/2017 |
| CN | 109101534 | 12/2018 |
| CN | 109308224 | 2/2019 |
| CN | 110069677 | 7/2019 |
| CN | 111460285 A | 7/2020 |
| CN | 112069422 A | 12/2020 |

(Continued)

OTHER PUBLICATIONS

Cloud Native: Using Containers, Function Computing and Data to Build Next Generation Applications, 2 pages (cited on Jun. 10, 2023).

*Primary Examiner* — Sibte H Bukhari (74) *Attorney, Agent, or Firm* — Knobbe, Martens, Olson & Bear, LLP (57) ABSTRACT

Some embodiments of present disclosure provide a method and apparatus for distributing content across platforms, a device and a storage medium, relates to the field of cloud storage technology, and may be applied to a cloud platform. A specific implementation of the method can include: receiving a content acquisition request, the content acquisition request containing content category information; generating identifier information of a sending end of the content acquisition request, and configuring the content category information under the identifier information; acquiring abstract information of content corresponding to the content category information; and sending the abstract information to the sending end of the content acquisition request based on the identifier information.

11 Claims, 6 Drawing Sheets

(56) References Cited

FOREIGN PATENT DOCUMENTS

| CN | 112084268 A | 12/2020 |
|----|-------------|---------|
| CN | 112947820 A | 6/2021  |

\* cited by examiner

METHOD AND APPARATUS FOR DISTRIBUTING CONTENT ACROSS PLATFORMS, DEVICE AND STORAGE MEDIUM

CROSS-REFERENCE TO RELATED APPLICATIONS

This application claims priority to Chinese Patent Application No. 202110672873.7, filed with the China National Intellectual Property Administration (CNIPA) on Jun. 17, 2021, the content of which is incorporated herein by reference in its entirety.

TECHNICAL FIELD

Embodiments of the present disclosure relate to the field of computer technology, specifically to the field of cloud storage technology, and particularly to a method and an apparatus for distributing content across platforms, a device and a storage medium.

BACKGROUND

At present, an approach to distributing document content mainly refers to that, accurate traffic from a search behavior of a user is obtained from a search channel, or that the user actively searches and browses, in a web page, corresponding document content. However, the above approaches are all dependent on the active search behavior of the user.

SUMMARY

Embodiments of the present disclosure propose a method and apparatus for distributing content across platforms, a device and a storage medium.

According to a first aspect of the present disclosure, some embodiments of the present disclosure provide a method for distributing content across platforms, including: receiving a content acquisition request, the content acquisition request containing content category information; generating identifier information of a sending end of the content acquisition request, and configuring the content category information under the identifier information; acquiring abstract information of content corresponding to the content category information; and sending the abstract information to the sending end of the content acquisition request based on the identifier information.

According to a second aspect of the present disclosure, some embodiments of the present disclosure provide a method for acquiring content across platforms, including: sending a content acquisition request, the content acquisition request containing content category information; and receiving and presenting abstract information of content corresponding to the content category information.

According to a third aspect of the present disclosure, some embodiments of the present disclosure provide an apparatus for distributing content across platforms, including: a receiving module, configured to receive a content acquisition request, the content acquisition request containing content category information; a generating module, configured to generate identifier information of a sending end of the content acquisition request, and configure the content category information under the identifier information; an acquiring module, configured to acquire abstract information of content corresponding to the content category information; and a first sending module, configured to send the abstract information to the sending end of the content acquisition request based on the identifier information.

According to a fourth aspect of the present disclosure, some embodiments of the present disclosure provide an apparatus for acquiring content across platforms, including: a third sending module, configured to send a content acquisition request, the content acquisition request containing content category information; and a first presenting module, configured to receive and present abstract information of content corresponding to the content category information.

According to a fifth aspect of the present disclosure, some embodiments of the present disclosure provide a server, including: at least one processor; and a storage device, communicated with the at least one processor, wherein the storage device stores an instruction executable by the at least one processor, and the instruction is executed by the at least one processor, to enable the at least one processor to perform the method as described in any implementation of the first aspect.

According to a sixth aspect of the present disclosure, some embodiments of the present disclosure provide a terminal device, including: at least one processor; and a storage device, communicated with the at least one processor, wherein the storage device stores an instruction executable by the at least one processor, and the instruction is executed by the at least one processor, to enable the at least one processor to perform the method as described in any implementation of the second aspect.

According to a seventh aspect of the present disclosure, some embodiments of the present disclosure provide a system for distributing content across platforms, including: the server as described in the fifth aspect and the terminal device as described in the sixth aspect.

According to an eighth aspect of the present disclosure, some embodiments of the present disclosure provide a non-transitory computer readable storage medium, storing a computer instruction, wherein the computer instruction is used to cause a computer to perform the method as described in the first aspect or the second aspect.

According to a ninth aspect of the present disclosure, some embodiments of the present disclosure provide a computer program product, comprising a computer program, wherein the computer program, when executed by a processor, implements the method as described in the first aspect or the second aspect.

It should be understood that the content described in this part is not intended to identify key or important features of the embodiments of the present disclosure, and is not used to limit the scope of the present disclosure. Other features of the present disclosure will be easily understood through the following description.

BRIEF DESCRIPTION OF THE DRAWINGS

After reading detailed descriptions of non-limiting embodiments given with reference to the following accompanying drawings, other features, objectives and advantages of the present disclosure will be more apparent. The accompanying drawings are used for a better understanding of the technical solution of the present disclosure, and do not constitute a limitation to the present disclosure. Here.

DETAILED DESCRIPTION OF EMBODIMENTS

Example embodiments of the present disclosure are described below in combination with the accompanying drawings, and various details of the embodiments of the present disclosure are included in the description to facilitate understanding, and should be considered as examples only. Accordingly, it should be recognized by one of ordinary skill in the art that various changes and modifications may be made to the embodiments described herein without departing from the scope and spirit of the present disclosure. Also, for clarity and conciseness, descriptions for well-known functions and structures are omitted in the following description.

It should be noted that embodiments in the present disclosure and the features in the embodiments may be combined with each other on a non-conflict basis. Embodiments of the present disclosure will be described below in detail with reference to the accompanying drawings.

Figure 1:
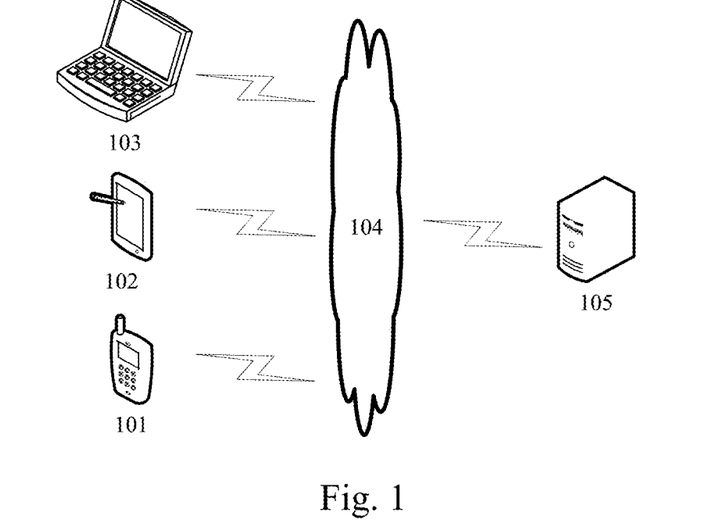
FIG. 1 is a diagram of an example system architecture in which embodiments of the present disclosure may be applied.

FIG. 1 illustrates an example system architecture 100 in which a method for distributing content across platforms or an apparatus for distributing content across platforms according to an embodiment of the present disclosure may be applied.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, for example, wired or wireless communication links, or optical fiber cables.

A user may use the terminal devices 101, 102 and 103 to interact with the server 105 via the network 104, to receive or send a message, etc. Various client applications may be installed on the terminal devices 101, 102 and 103.

The terminal devices 101, 102 and 103 may be hardware or software. When being the hardware, the terminal devices 101, 102 and 103 may be various electronic devices, the electronic devices including, but not limited to, a smartphone, a tablet computer, a laptop portable computer, a desktop computer, and the like. When being the software, the terminal devices 101, 102 and 103 may be installed in the above listed electronic devices. The terminal devices 101, 102 and 103 may be implemented as a plurality of pieces of software or a plurality of software modules, or may be implemented as a single piece of software or a single software module, which will not be specifically limited here.

The server 105 may provide various services. For example, the server 105 may analyze and process a content acquisition request acquired from the terminal devices 101, 102 and 103, and generate a processing result (e.g., abstract information).

It should be noted that the server 105 may be hardware or software. When being the hardware, the server 105 may be implemented as a distributed server cluster composed of a plurality of servers, or may be implemented as a single server. When being the software, the server 105 may be implemented as a plurality of pieces of software or a plurality of software modules (e.g., software or software modules for providing a distributed service), or may be implemented as a single piece of software or a single software module, which will not be specifically limited here.

It should be noted that the method for distributing content across platforms provided in embodiments of the present disclosure is generally performed by the server 105. Correspondingly, the apparatus for distributing content across platforms is generally provided in the server 105.

It should be appreciated that the numbers of the terminal devices, the networks and the servers in FIG. 1 are merely illustrative. Any number of terminal devices, networks and servers may be provided based on actual requirements.

Figure 2:
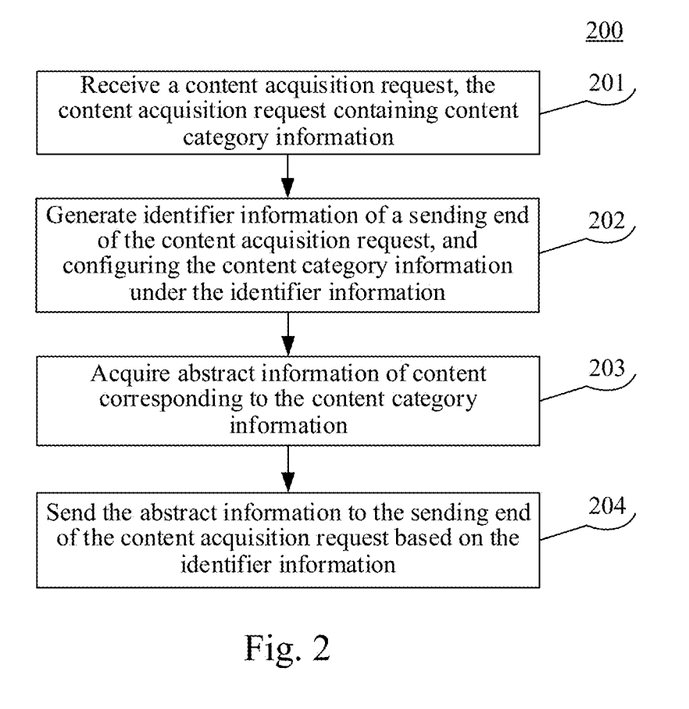
FIG. 2 is a flowchart of a method for distributing content across platforms according to an embodiment of the present disclosure.

Further referring to FIG. 2, FIG. 2 illustrates a flow 200 of a method for distributing content across platforms according to an embodiment of the present disclosure. The method for distributing content across platforms includes the following steps:

Step 201, receiving a content acquisition request, the content acquisition request containing content category information.

In this embodiment, an executing body (e.g., the server 105 shown in FIG. 1) of the method for distributing content across platforms may receive the content acquisition request. Here, the content acquisition request contains the content category information. The terminal devices 101, 102 and 103 may send a content acquisition request. The content acquisition request refers to related information that may represent content that the terminal devices 101, 102 and 103 want to acquire from a server end, the content acquisition request containing the content category information.

Here, the content category information refers to information indicating a category of acquired content. For example, the content category information may include an education category, a life category, a language category, and the like, and the content acquisition request sent by a terminal device may include one or more of the categories of the acquired content.

Step 202, generating identifier information of a sending end of the content acquisition request, and configuring the content category information under the identifier information.

In this embodiment, the above executing body may generate corresponding identifier information for a sending end of each content acquisition request, for example, may generate a corresponding UUID (Universally Unique Identifier) for the sending end of the each content acquisition request. After receiving the content acquisition request sent by the sending end of the content acquisition request, the above executing body configures the content category information in the content acquisition request as a parameter to be under the generated identifier information (UUID), to manage, in a unified manner, all terminal devices sending the content acquisition request, and distribute the content corresponding to the content acquisition request to each terminal device according to an account identifier.

Step 203, acquiring abstract information of content corresponding to the content category information.

In this embodiment, the above executing body may acquire the abstract information of the content corresponding to the content category information. Here, in this embodiment, a content database is preset. The content database stores related content of various categories. After receiving the content acquisition request containing the content category information and sent by the terminal device, the above executing body acquires, from the content database, the abstract information of the content corresponding to the content category information.

Here, the content in the content database may have corresponding basic information. The basic information may include information such as a title, a cover image, a number of times of reading, an author, and update time. In this embodiment, the basic information is extracted, and is used as the abstract information that can reflect the subject information of the content.

After receiving the content acquisition request sent by the terminal device, the above executing body acquires abstract information of all content corresponding to the content category information contained in the content acquisition request.

Step 204, sending the abstract information to the sending end of the content acquisition request based on the identifier information.

In this embodiment, the above executing body may send the abstract information acquired in step 203 to the sending end of the content acquisition request based on the identifier information generated in step 202. The sending end of the content acquisition request is the terminal device described above. After acquiring the abstract information of all the content corresponding to the content category information contained in the content acquisition request, the above executing body sends the acquired abstract information to the terminal device based on the identifier information, thereby completing the cross-platform content distribution process.

It should be noted that the above executing body may distribute corresponding abstract information to the terminal device according to the UUID of the terminal device.

According to the method for distributing content across platforms provided in the embodiment of the present disclosure: first, acquiring the content acquisition request; then, generating the identifier information of the sending end of the content acquisition request, and configuring the content category information under the identifier information; next, acquiring the abstract information of the content corresponding to the content category information; and finally, sending the abstract information to the sending end of the content acquisition request. An embodiment of the present disclosure provides a method for distributing content across platforms. According to the method, the abstract information of the content corresponding to the content acquisition request sent by the terminal device can be acquired, and the abstract information can be sent to the terminal device, thereby implementing the cross-platform content distribution, which increases the content distribution approach and enriches the channel through which the user acquires the content. In addition, all the terminal devices sending the content acquisition request are managed in a unified manner based on the identifier information, which makes the content distribution process more targeted and also improves the efficiency of the content distribution.

Figure 3:
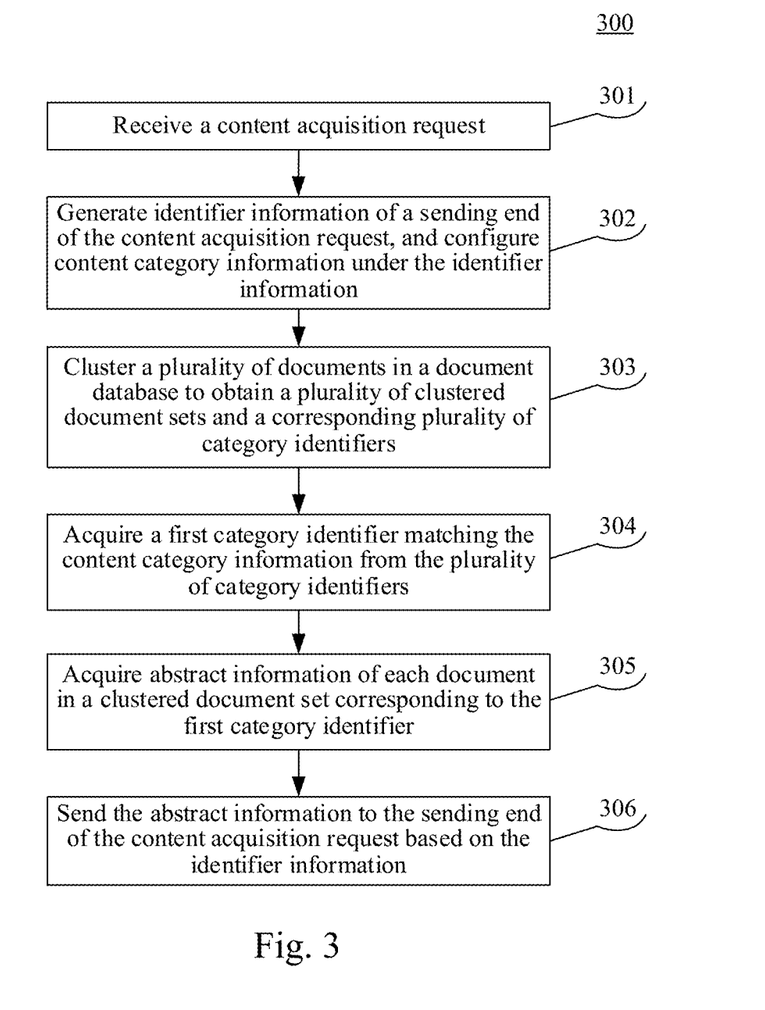
FIG. 3 is a flowchart of the method for distributing content across platforms according to another embodiment of the present disclosure.

Further referring to FIG. 3, FIG. 3 illustrates a flow 300 of the method for distributing content across platforms according to another embodiment of the present disclosure. The method for distributing content across platforms includes the following steps:

Step 301, receiving a content acquisition request.

In this embodiment, an executing body (e.g., the server 105 shown in FIG. 1) of the method for distributing content across platforms may receive the content acquisition request. Here, the content acquisition request contains content category information.

Step 302, generating identifier information of a sending end of the content acquisition request, and configuring content category information under the identifier information.

Steps 301-302 are substantially consistent with steps 201-202 in the foregoing embodiment. For the specific implementation of steps 301-302, reference may be made to the foregoing description for steps 201-202, which will not be repeatedly described here.

Step 303, clustering a plurality of documents in a document database to obtain a plurality of clustered document sets and a corresponding plurality of category identifiers.

In this embodiment, the above executing body may cluster the plurality of documents in the document database to obtain the plurality of clustered document sets and the corresponding plurality of category identifiers. Here, the document database is a preset database, which stores the content of a plurality of documents.

The above executing body may perform a clustering operation on the plurality of documents in the document database. That is, a plurality of categories (e.g., an education category, a life category and a language category) may be preset, and the plurality of documents are clustered based on the plurality of preset categories, thus obtaining a clustered document set corresponding to each category. Each clustered document set corresponds to one category identifier. For example, an education-category document set contains a document related to education, and the category identifier corresponding to the document set refers to the education category. A language-category document set contains a document related to a language, and the category identifier corresponding to the document set refers to the language category. It should be noted that, in this embodiment, documents in different clustered document sets may be crossed, that is, a document 1 is in the education-category document set, but the document 1 may also be in the language-category document set.

It should be noted that the sequence in which step 303 is performed is not specifically limited in embodiments of the present disclosure, that is, step 303 may be performed before step 301, or performed after step 302, or step 303 and steps 301-302 may be simultaneously performed.

In some alternative implementations of this embodiment, step 303 includes the following steps:

1) A semantic analysis is respectively performed on theme information of the plurality of documents in the document database, to obtain a document tag set corresponding to the documents.

The above executing body may perform the semantic analysis on the theme information of the plurality of documents in the document database, to obtain the document tag set corresponding to the documents. Here, the theme information may refer to a title of a document, and an approach of the semantic analysis may refer to semantic tagging or semantic disassembly, which will not be specifically limited in embodiments of the present disclosure. For example, the above executing body may semantically disassemble the title of each of the plurality of documents, to use a high-frequency term in the title as a tag and mark the term, such that the each document has one or more tags.

Correspondingly, the obtained tags may further be filtered to obtain a tag that may represent the theme of the document. For example, a modal particle tag in the tags may be filtered. Since modal particles like "oh," "ah," "wow" and "eh" are generally used to indicate a tone or pause, and cannot be used to indicate the subject of the document, the modal particle tag is filtered, thus obtaining a tag that can really express the content of the document.

Finally, the tag of each document is combined to obtain the document tag set containing the tags of the documents.

2) All tags in the document tag set corresponding to the documents are clustered according to a first classification principle, to obtain a tag classification result and the corresponding plurality of category identifiers.

The above executing body may cluster all the tags in the document tag set according to the first classification principle, to obtain the tag classification result and the corresponding plurality of category identifiers. Here, the first classification principle may refer to a preset category. The tags in the document tag set are clustered according to the preset category, to obtain a tag set corresponding to each category. Each tag set has one corresponding category identifier.

3) Documents corresponding to the tags are classified based on the tag classification result, to obtain the plurality of clustered document sets corresponding to the plurality of category identifiers one to one.

The above executing body may classify a document corresponding to each tag based on the tag classification result. That is, each category identifier corresponds one tag set. The document corresponding to each tag in the tag set is classified based on the tag classification result, to obtain the plurality of clustered document sets corresponding to the plurality of category identifiers one to one.

In this embodiment, the document tag set containing the tags of the documents is first clustered, to obtain the tag classification result and the corresponding plurality of category identifiers, and then, the documents corresponding to the tags are classified based on the tag classification result, to obtain the clustered document sets corresponding to the category identifiers one to one. This process improves the accuracy of the classification.

In some alternative embodiments of this embodiment, step 303 further includes: sorting the documents in the clustered document sets based on attribute information of each document in the clustered document sets, to obtain a sorting result. Here, the attribute information may be information such as a number of times of reading a document and a number of downloads. As an example, the each document in the clustered document sets may be sorted according to the number of times of reading, to obtain a sorting result, that is, sorted document sets. As another example, a weighted calculation may be performed on the number of times of reading the document and the number of the downloads to obtain a calculated composite value, and then, each document in the clustered document sets may be sorted according to the composite value, to obtain a sorting result, that is, sorted document sets.

Step 304, acquiring a first category identifier matching the content category information from the plurality of category identifiers.

In this embodiment, the above executing body may acquire the first category identifier matching the content category information from the plurality of category identifiers. Here, since the content acquisition request sent by the terminal device contains the content category information, the above executing body performs matching on the content category information and the plurality of category identifiers obtained in step 302, to obtain the first category identifier matching the content category information in the plurality of category identifiers.

Step 305, acquiring abstract information of each document in a clustered document set corresponding to the first category identifier.

In this embodiment, the above executing body may acquire the abstract information of the each document in the clustered document set corresponding to the first category identifier. Since each category identifier corresponds to one clustered document set, after determining the first category identifier, the above executing body determines the clustered document set corresponding to the first category identifier, and then acquires the abstract information of the each document in the clustered document set. Accordingly, the abstract information of the document corresponding to the content category information is obtained.

Step 306, sending the abstract information to the sending end of the content acquisition request based on the identifier information.

Step 306 is substantially consistent with step 204 in the foregoing embodiment. For the specific implementation of step 306, reference may be made to the foregoing description for step 204, which will not be repeatedly described here.

In some alternative implementations of this embodiment, step 306 includes: sorting the abstract information according to the sorting result, to obtain sorted abstract information; and sending the sorted abstract information to the sending end of the content acquisition request based on the identifier information. The abstract information corresponding to each document is sorted based on the sorting result, such that the sorted abstract information can also comprehensively reflect the worth of the document corresponding to the sorted abstract information. Then, the sorted abstract information is sent to the terminal device based on the identifier information.

It can be seen from FIG. 3 that, as compared with the embodiment corresponding to FIG. 2, according to the method for distributing content across platforms in this embodiment, the plurality of documents in the document database are first clustered to obtain the plurality of clustered document sets and the corresponding plurality of category identifiers, the first category identifier matching the content category information in the plurality of category identifiers is then determined, the abstract information of the each document in the clustered document set corresponding to the first category identifier is then acquired, and finally, the abstract information is sent to the terminal device, thereby improving the efficiency of the cross-platform content distribution.

Figure 4:
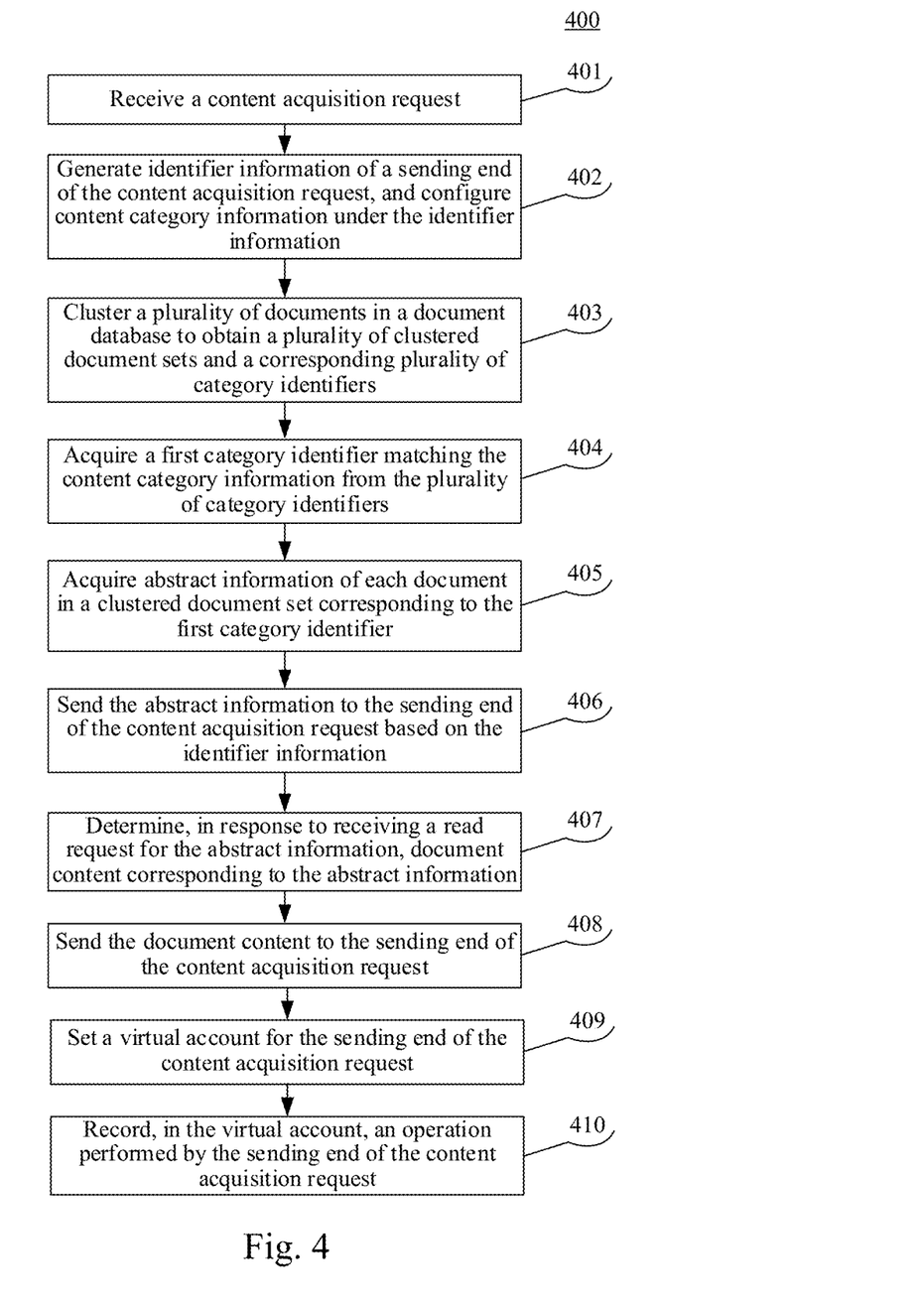
FIG. 4 is a flowchart of the method for distributing content across platforms according to still another embodiment of the present disclosure.

Further referring to FIG. 4, FIG. 4 illustrates a flow 400 of the method for distributing content across platforms according to still another embodiment of the present disclosure. The method for distributing content across platforms includes the following steps:

Step 401, receiving a content acquisition request.

Step 402, generating identifier information of a sending end of the content acquisition request, and configuring content category information under the identifier information.

Step 403, clustering a plurality of documents in a document database to obtain a plurality of clustered document sets and a corresponding plurality of category identifiers.

Step 404, acquiring a first category identifier matching the content category information from the plurality of category identifiers.

Step 405, acquiring abstract information of each document in a clustered document set corresponding to the first category identifier.

Step 406, sending the abstract information to the sending end of the content acquisition request based on the identifier information.

Steps 401-406 are substantially consistent with steps 301-306 in the foregoing embodiment. For the specific implementation of steps 401-406, reference may be made to the foregoing description for steps 301-306, which will not be repeatedly described here.

Step 407, determining, in response to receiving a read request for the abstract information, document content corresponding to the abstract information.

In this embodiment, an executing body (e.g., the server 105 shown in FIG. 1) of the method for distributing content across platforms may determine, when receiving a read request of a terminal device for the abstract information, the document content corresponding to the abstract information. Here, the read request of the terminal device for the abstract information may refer to that a user clicks on the abstract information displayed on the terminal device. For example, the terminal device displays a plurality of pieces of abstract information to the user, and the user clicks on a certain piece of abstract information in the plurality of pieces of abstract information. At this time, the above executing body receives the read request sent by the terminal device for the abstract information, and then acquires the document content corresponding to the abstract information.

Alternatively, after receiving the read request of the user for the abstract information, the terminal device may further send a user identifier to the above executing body. The above executing body may configure a parameter for the user based on the user identifier, for example, configure related right information for the user, such that the user may subsequently perform a corresponding operation (e.g., a purchase operation) on the document content.

Step 408, sending the document content to the sending end of the content acquisition request.

In this embodiment, the above executing body may send the document content determined in step 407 to the sending end of the content acquisition request. After determining the document content corresponding to the abstract information, the above executing body sends the document content corresponding to the abstract information to the terminal device, such that the terminal device displays the document content to the user.

Step 409, setting a virtual account for the sending end of the content acquisition request.

In this embodiment, the above executing body may set a virtual account for the sending end of each content acquisition request, and the sending end of the content acquisition request may store the virtual currency in the virtual account.

It should be noted that step 409 may be performed after any one of steps 401-408, which will not be specifically limited in embodiments of the present disclosure.

Step 410, recording, in the virtual account, an operation performed by the sending end of the content acquisition request.

In this embodiment, the above executing body may record, in the virtual account, the operation performed by the sending end of the content acquisition request. As an example, after an interactive operation is completed, the above executing body may record the operation in the virtual account. As another example, after the operation that the user purchases the document content at the sending end of the content acquisition request, the sending end of the content acquisition request sends the related information to the above executing body. After receiving the related information, the above executing body records the related information in the virtual account at the sending end of the content acquisition request, and may further make a deduction from the virtual currency stored in the virtual account, such that the user can complete the purchase and payment operations only on the terminal device without other channels, thereby simplifying the purchase process and improving the use experience of the user.

It can be seen from FIG. 4 that, as compared with the embodiment corresponding to FIG. 3, according to the method for distributing content across platforms in this embodiment, it is possible to determine the document content corresponding to the abstract information after the read request for the abstract information is received, and send the document content to the terminal device, such that the terminal device presents the complete document content to the user; and moreover, it is possible to set the virtual account for the sending end of the content acquisition request, and record, in the virtual account, the operation performed by the sending end of the content acquisition request, to manage all sending ends in a unified manner, thereby also simplifying the user's operation process and improving the user experience.

Figure 5:
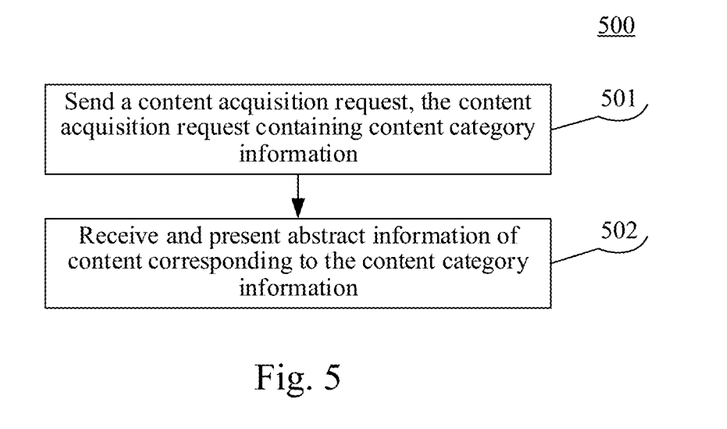
FIG. 5 is a flowchart of a method for acquiring content across platforms according to an embodiment of the present disclosure.

Further referring to FIG. 5, FIG. 5 is a flowchart 500 of a method for acquiring content across platforms according to an embodiment of the present disclosure. The method for acquiring content across platforms includes the following steps:

Step 501, sending a content acquisition request, the content acquisition request containing content category information.

In this embodiment, an executing body (e.g., the terminal devices 101, 102 and 103 shown in FIG. 1) of the method for acquiring content across platforms may send the content acquisition request, the content acquisition request containing the content category information. Here, the content category information may refer to an education category, a language category, a life category, a science category, a technology category, and the like. The terminal device may determine the category information of the content that the terminal device needs to acquire according to its own requirement and position, to send the content acquisition request containing the content category information to the server to acquire the corresponding content.

Step 502, receiving and presenting abstract information of content corresponding to the content category information.

In this embodiment, the above executing body may receive and present the abstract information of the content corresponding to the content category information. After receiving the content acquisition request sent by the above executing body, a server acquires the content category information in the content acquisition request, and determines a document set corresponding to the content category information. Then, the server extracts abstract information of all documents in the corresponding document set. Finally, the server sends the abstract information to the above executing body. The above executing body may receive the abstract information of the content that corresponds to the content category information and is sent by the server, and present the abstract information to the user.

According to the method for acquiring content across platforms provided in the embodiment of the present disclosure, the content acquisition request is first sent, and then, the abstract information of the content corresponding to the content category information is received and presented. An embodiment of the present disclosure provides a method for acquiring content across platforms. According to the method, the terminal device can acquire related content according to its own requirement, and present the abstract information of the acquired content to the user, which enriches the channel through which the user acquires the information of the content.

Figure 6:
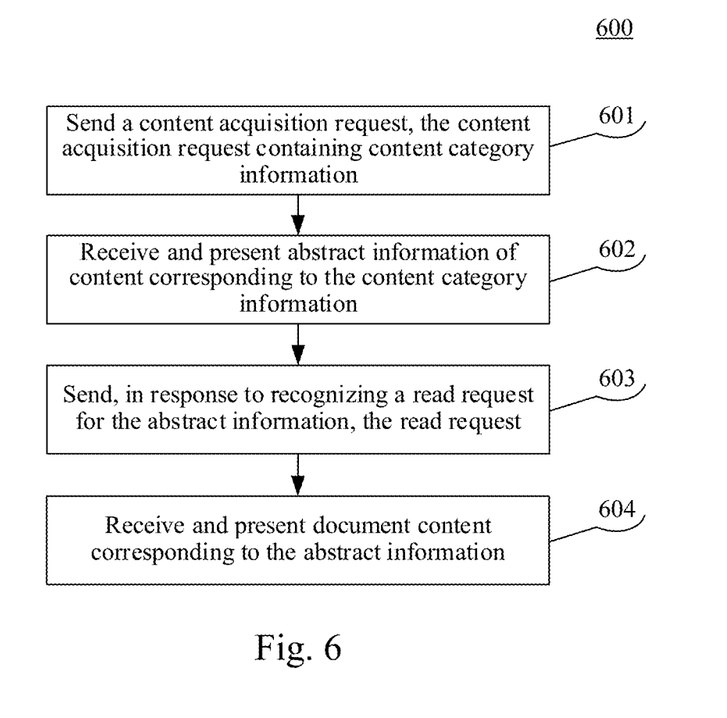
FIG. 6 is a flowchart of the method for acquiring content across platforms according to another embodiment of the present disclosure.

Further referring to FIG. 6, FIG. 6 is a flowchart 600 of the method for acquiring content across platforms according to another embodiment of the present disclosure. The method for acquiring content across platforms includes the following steps:

Step 601, sending a content acquisition request, the content acquisition request containing content category information.

Step 602, receiving and presenting abstract information of content corresponding to the content category information.

Steps 601-602 are substantially consistent with steps 501-502 in the foregoing embodiment. For the specific implementation of steps 601-602, reference may be made to the foregoing description for steps 501-502, which will not be repeatedly described here.

Step 603, sending, in response to recognizing a read request for the abstract information, the read request.

In this embodiment, an executing body (e.g., the terminal devices 101, 102 and 103 shown in FIG. 1) of the method for acquiring content across platforms may send, after recognizing a read request of a user for the abstract information, the read request to a server. Here, the read request of the user for the abstract information may refer to that the user clicks on the abstract information, which represents that the user wants to read the abstract information. After recognizing the click operation of the user for the abstract information, the above executing body sends the read request to the server.

Step 604, receiving and presenting document content corresponding to the abstract information.

In this embodiment, the above executing body may receive and present the document content corresponding to the abstract information. After receiving the read request sent by the above executing body, the server sends the document content corresponding to the abstract information to the above executing body, to cause the above executing body to receive and present the abstract information.

In some alternative implementations of this embodiment, step 604 includes: acquiring, in response to recognizing a read operation for the abstract information, the document content corresponding to the abstract information; resolving the document content to obtain a resolution result; and presenting the resolution result. That is, in this embodiment, after acquiring the document content corresponding to the abstract information, the above executing body may resolve the acquired document content through a document content resolver, to obtain the resolution result. Here, the document content resolver may refer to a general-purpose reader SDK (Software Development Kit) and a code, to be suitable for various terminal devices. In addition, the resolution result may be presented to the user according to a preset pattern, thereby enriching the presented content.

In some alternative implementations of this embodiment, step 604 may further include: acquiring, in response to recognizing the read operation for the abstract information, a URL (Uniform Resource Locator) address of the document content corresponding to the abstract information; and jumping to the URL address. After recognizing the read operation of the user for the abstract information, the above executing body may send the URL address of the document content corresponding to the acquired abstract information to the server, and jump to the URL address, such that the user can acquire the document content corresponding to the abstract information. According to this presentation approach, the process in which the document content resolver resolves the document content is omitted, and thus, the document content can be presented to the user more conveniently.

It can be seen from FIG. 6 that, as compared with the embodiment corresponding to FIG. 5, according to the method for acquiring content across platforms in this embodiment, the document content corresponding to the abstract information may be presented to the user by various means after the user clicks on the abstract information, such that the user acquires the interested content more conveniently, which makes the application range wider.

Figure 7:
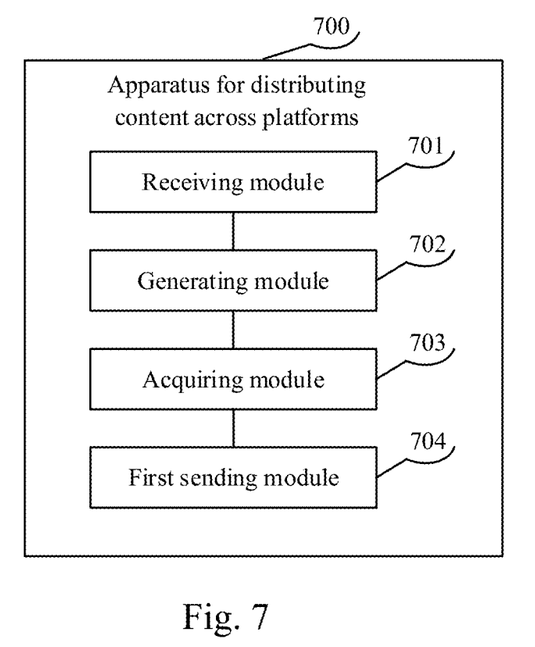
FIG. 7 is a schematic structure diagram of an apparatus for distributing content across platforms according to an embodiment of the present disclosure.

Further referring to FIG. 7, as an implementation of the method shown in the above drawings, an embodiment of the present disclosure provides an apparatus for distributing content across platforms. The embodiment of the apparatus corresponds to the embodiment of the method shown in FIG. 2, and the apparatus may be applied in various electronic devices.

As shown in FIG. 7, the apparatus 700 for distributing content across platforms in this embodiment may include: a receiving module 701, a generating module 702, an acquiring module 703 and a first sending module 704. Here, the receiving module 701 is configured to receive a content acquisition request, the content acquisition request containing content category information. The generating module 702 is configured to generate identifier information of a sending end of the content acquisition request, and configure the content category information under the identifier information. The acquiring module 703 is configured to acquire abstract information of content corresponding to the content category information. The first sending module 704 is configured to send the abstract information to the sending end of the content acquisition request based on the identifier information.

In this embodiment, for specific processes of the receiving module 701, the generating module 702, the acquiring module 703 and the first sending module 704 in the apparatus 700 for distributing content across platforms in this embodiment, and their technical effects, reference may be respectively made to relative descriptions of steps 201-204 in the corresponding embodiment of FIG. 2, which will not be repeatedly described here.

In some alternative implementations of this embodiment, the apparatus for distributing content across platforms further includes: a clustering module, configured to cluster a plurality of documents in a document database to obtain a plurality of clustered document sets and a corresponding plurality of category identifiers. The acquiring module includes: a first acquiring submodule, configured to acquire a first category identifier matching the content category information from the plurality of category identifiers; and a second acquiring submodule, configured to acquire abstract information of each document in a clustered document set corresponding to the first category identifier.

In some alternative implementations of this embodiment, the clustering module includes: a semantic analysis submodule, configured to perform respectively a semantic analysis on theme information of the plurality of documents in the document database, to obtain a document tag set corresponding to the documents; a clustering submodule, configured to cluster all tags in the document tag set corresponding to the documents according to a first classification principle, to obtain a tag classification result and the corresponding plurality of category identifiers; and a classifying submodule, configured to classify documents corresponding to the tags based on the tag classification result, to obtain the plurality of clustered document sets corresponding to the plurality of category identifiers one to one.

In some alternative implementations of this embodiment, the apparatus for distributing content across platforms further includes: a sorting module, configured to sort documents in the clustered document sets based on attribute information of each document in the clustered document sets, to obtain a sorting result. The first sending module includes: a sorting submodule, configured to sort the abstract information according to the sorting result, to obtain sorted abstract information; and a sending submodule, configured to send the sorted abstract information to the sending end of the content acquisition request based on the identifier information.

In some alternative implementations of this embodiment, the apparatus for distributing content across platforms further includes: a determining module, configured to determine, in response to receiving a read request for the abstract information, document content corresponding to the abstract information; and a second sending module, configured to send the document content to the sending end of the content acquisition request.

Figure 8:
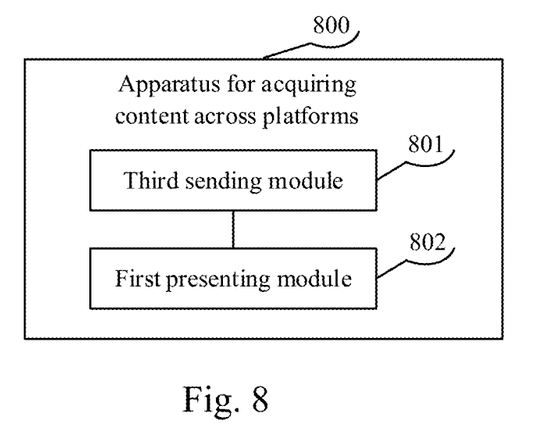
FIG. 8 is a schematic structure diagram of an apparatus for acquiring content across platforms according to an embodiment of the present disclosure.

Further referring to FIG. 8, as an implementation of the method shown in the above drawings, an embodiment of the present disclosure provides an apparatus for acquiring content across platforms. The embodiment of the apparatus corresponds to the embodiment of the method shown in FIG. 5, and the apparatus may be applied in various electronic devices.

As shown in FIG. 8, the apparatus 800 for acquiring content across platforms in this embodiment may include: a third sending module 801 and a first presenting module 802. Here, the third sending module 801 is configured to send a content acquisition request, the content acquisition request containing content category information. The first presenting module 802 is configured to receive and present abstract information of content corresponding to the content category information.

In this embodiment, for specific processes of the third sending module 801 and the first presenting module 802 in the apparatus 800 for acquiring content across platforms in this embodiment, and their technical effects, reference may be respectively made to relative descriptions of steps 501-502 in the corresponding embodiment of FIG. 5, which will not be repeatedly described here.

In some alternative implementations of this embodiment, the apparatus for acquiring content across platforms further includes: a fourth sending module, configured to send, in response to recognizing a read request for the abstract information, the read request; and a second presenting module, configured to receive and present document content corresponding to the abstract information.

In some alternative implementations of this embodiment, the second presenting module includes: a third acquiring submodule, configured to acquire the document content corresponding to the abstract information; a resolving submodule, configured to resolve the document content to obtain a resolution result; and a presenting submodule, configured to present the resolution result.

Figure 9:
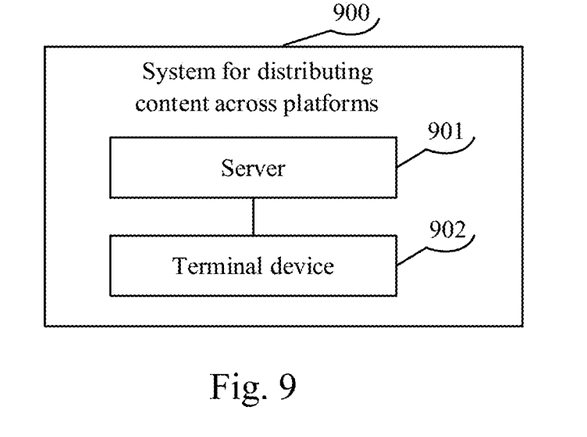
FIG. 9 is a schematic structure diagram of a system for distributing content across platforms that is used to implement embodiments of the present disclosure.

Further referring to FIG. 9, FIG. 9 is a schematic structure diagram of a system for distributing content across platforms that is used to implement embodiments of the present disclosure. As shown in FIG. 9, the system 900 for distributing content across platforms in this embodiment may include a server 901 and a terminal device 902.

First, the terminal device 902 sends a content acquisition request containing content category information to the server 901. The server 901 receives the content acquisition request, generates identifier information of a sending end of the content acquisition request, and configures the content category information under the identifier information. Then, the server 901 acquires abstract information of content corresponding to the content category information, and sends the abstract information to the terminal device 902. Finally, the terminal device 902 receives the abstract information of the content that corresponds to the content category information and is sent by the server 901, and presents the abstract information.

According to embodiments of the present disclosure, a server, a readable storage medium, and a computer program product are further provided.

Figure 10:
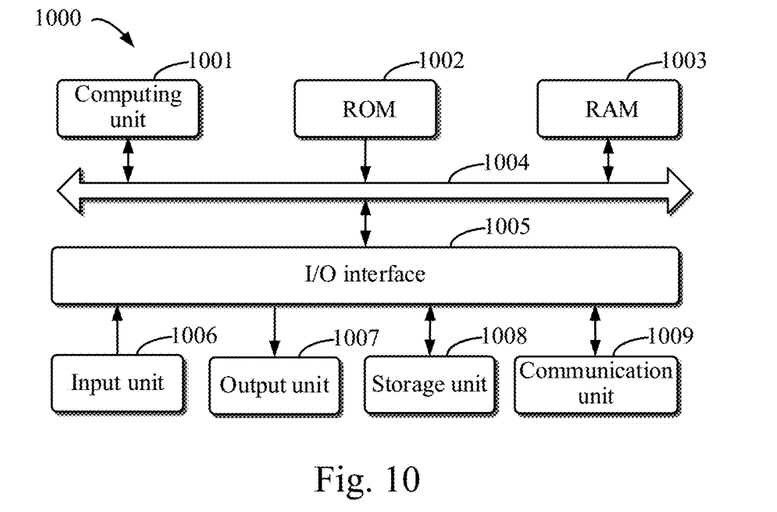
FIG. 10 is a block diagram of an electronic device used to implement a method for distributing content across platforms according to embodiments of the present disclosure.

FIG. 10 is a schematic block diagram of an example electronic device 1000 that may be used to implement embodiments of the present disclosure. An electronic device is intended to represent various forms of digital computers such as a laptop computer, a desktop computer, a workstation, a personal digital assistant, a server, a blade server, a mainframe computer, and other appropriate computers. The electronic device may also represent various forms of mobile apparatuses such as personal digital assistant , a cellular telephone, a smart phone, a wearable device and other similar computing apparatuses. The parts shown herein, their connections and relationships, and their functions are only as examples, and not intended to limit implementations of the present disclosure as described and/or claimed herein.

As shown in FIG. 10, the device 1000 includes a computing unit 1001, which may execute various appropriate actions and processes in accordance with a computer program stored in a read-only memory (ROM) 1002 or a computer program loaded into a random access memory (RAM) 1003 from a storage unit 1008. The RAM 1003 also stores various programs and data required by operations of the device 1000. The computing unit 1001, the ROM 1002 and the RAM 1003 are connected to each other through a bus 1004. An input/output (I/O) interface 1005 is also connected to the bus 1004.

A plurality of components in the device 1000 are coupled to the I/O interface 1005, including: an input unit 1006, such as a keyboard or a mouse; an output unit 1007, such as various types of displays, or speakers; the storage unit 1008, such as a disk or an optical disk; and a communication unit 1009 such as a network card, a modem, or a wireless communication transceiver. The communication unit 1009 allows the device 1000 to exchange information/data with other devices over a computer network such as the Internet and/or various telecommunication networks.

The computing unit 1001 may be various general-purpose and/or dedicated processing components having processing and computing capabilities. Some examples of the computing unit 1001 include, but are not limited to, central processing unit (CPU), graphics processing unit (GPU), various dedicated artificial intelligence (AI) computing chips, various computing units running machine learning model algorithms, digital signal processor (DSP), and any appropriate processors, controllers, microcontrollers, etc. The computing unit 1001 performs the various methods and processes described above, such as the method for distributing content across platforms. For example, in some embodiments, the method for distributing content across platforms may be implemented as a computer software program, which is tangibly included in a machine readable medium, such as the storage unit 1008. In some embodiments, part or all of the computer program may be loaded and/or installed on the device 1000 via the ROM 1002 and/or the communication unit 1009. When the computer program is loaded into the RAM 1003 and executed by the computing unit 1001, one or more steps of the method for distributing content across platforms described above may be performed. Alternatively, in other embodiments, the computing unit 1001 may be configured to perform the method for configuring a color by any other appropriate means (for example, by means of firmware).

Various embodiments of the systems and technologies described in this article may be implemented in digital electronic circuit systems, integrated circuit systems, field programmable gate arrays (FPGA), application specific integrated circuits (ASIC), application-specific standard products (ASSP), system-on-chip (SOC), complex programmable logic device (CPLD), computer hardware, firmware, software, and/or their combinations. These various embodiments may include: being implemented in one or more computer programs, the one or more computer programs may be executed and/or interpreted on a programmable system including at least one programmable processor, the programmable processor may be a dedicated or general-purpose programmable processor that may receive data and instructions from a storage system, at least one input apparatus, and at least one output apparatus, and transmit the data and instructions to the storage system, the at least one input apparatus, and the at least one output apparatus.

Program codes for implementing the method of some embodiments of the present disclosure may be written in any combination of one or more programming languages. These program codes may be provided to a processor or controller of a general purpose computer, special purpose computer or other programmable data processing apparatus such that the program codes, when executed by the processor or controller, enables the functions/operations specified in the flowcharts and/or block diagrams being implemented. The program codes may execute entirely on the machine, partly on the machine, as a stand-alone software package partly on the machine and partly on the remote machine, or entirely on the remote machine or server.

In the context of some embodiments of the present disclosure, the machine readable medium may be a tangible medium that may contain or store programs for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, portable computer disk, hard disk, random access memory (RAM), read only memory (ROM), erasable programmable read only memory (EPROM or flash memory), optical fiber, portable compact disk read only memory (CD-ROM), optical storage device, magnetic storage device, or any suitable combination of the foregoing.

In order to provide interaction with a user, the systems and technologies described herein may be implemented on a computer, the computer has: a display apparatus (e.g., CRT (cathode ray tube) or LCD (liquid crystal display) monitor for displaying information to the user; and a keyboard and a pointing apparatus (for example, a mouse or trackball), the user may use the keyboard and the pointing apparatus to provide input to the computer. Other kinds of apparatuses may also be used to provide interaction with the user; for example, the feedback provided to the user may be any form of sensory feedback (for example, visual feedback, auditory feedback, or tactile feedback); and may use any form (including acoustic input, voice input, or tactile input) to receive input from the user.

The systems and technologies described herein may be implemented in a computing system (e.g., as a data server) that includes back-end components, or a computing system (e.g., an application server) that includes middleware components, or a computing system (for example, a user computer with a graphical user interface or a web browser, through which the user may interact with the embodiments of the systems and technologies described herein) that includes front-end components, or a computing system that includes any combination of such back-end components, middleware components, or front-end components. The components of the system may be interconnected by any form or medium of digital data communication (e.g., a communication network). Examples of the communication network include: local area network (LAN), wide area network (WAN), and Internet.

The computer system may include a client and a server. The client and the server are generally far from each other and usually interact through a communication network. The client and server relationship is generated by computer programs operating on the corresponding computer and having client-server relationship with each other. The server may be a cloud server, also known as a cloud computing server or a cloud host, which is a host product in a cloud computing service system and may solve the defects of difficult management and weak service scalability existing in a conventional physical host and a VPS (Virtual Private Server) service.

It should be understood that various forms of processes shown above may be used to reorder, add, or delete steps. For example, the steps described in embodiments of the present disclosure may be performed in parallel, sequentially, or in different orders, as long as the desired results of the technical solution disclosed in embodiments of the present disclosure can be achieved, no limitation is made herein.

The above specific embodiments do not constitute a limitation on the protection scope of the present disclosure. Those skilled in the art should understand that various modifications, combinations, sub-combinations and substitutions can be made according to design requirements and other factors. Any modification, equivalent replacement and improvement made within the spirit and principle of the present disclosure shall be included in the protection scope of the present disclosure.

What is claimed is:

1. A method for distributing content across platforms, comprising:

receiving a content acquisition request, the content acquisition request including content category information;

generating identifier information of a sending end of the content acquisition request, and configuring the content category information under the identifier information;

acquiring abstract information of content corresponding to the content category information; and sending the abstract information to the sending end of the content acquisition request based on the identifier information, wherein, before acquiring the abstract information of content corresponding to the content category information, the method further comprises:

clustering a plurality of documents in a document database to obtain a plurality of clustered document sets and a corresponding plurality of category identifiers, and wherein acquiring the abstract information of content corresponding to the content category information comprises:

acquiring a first category identifier matching the content category information from the plurality of category identifiers; and acquiring abstract information of each document in a clustered document set corresponding to the first category identifier.

2. The method according to claim 1, wherein clustering the plurality of documents in the document database to obtain the plurality of clustered document sets and the corresponding plurality of category identifiers comprises:

performing respectively a semantic analysis on theme information of the plurality of documents in the document database to obtain a document tag set corresponding to the documents;

clustering all tags in the document tag set corresponding to the documents according to a first classification principle to obtain a tag classification result and the corresponding plurality of category identifiers; and classifying documents corresponding to the tags based on the tag classification result to obtain the plurality of clustered document sets corresponding to the plurality of category identifiers one to one.

3. The method according to claim 2, further comprising:

sorting the documents in the clustered document sets based on attribute information of each document in the clustered document sets to obtain a sorting result, wherein sending the abstract information to the sending end of the content acquisition request based on the identifier information comprises:

sorting the abstract information according to the sorting result to obtain sorted abstract information; and sending the sorted abstract information to the sending end of the content acquisition request based on the identifier information.

4. The method according to claim 1, further comprising:

determining, in response to receiving a read request for the abstract information, document content corresponding to the abstract information; and sending the document content to the sending end of the content acquisition request.

5. The method according to claim 4, further comprising:

setting a virtual account for the sending end of the content acquisition request; and recording, in the virtual account, an operation performed by the sending end of the content acquisition request.

6. A server, comprising:

at least one processor; and a storage device configured to communicate with the at least one processor, wherein the storage device, is configured to store computer-executable instructions, that when executed by the at least one processor, cause the at least one processor to perform operations, the operations comprising:

receiving a content acquisition request, the content acquisition request including content category information;

generating identifier information of a sending end of the content acquisition request, and configuring the content category information under the identifier information;

acquiring abstract information of content corresponding to the content category information; and sending the abstract information to the sending end of the content acquisition request based on the identifier information, wherein, before acquiring the abstract information of content corresponding to the content category information, the operations further comprise:

clustering a plurality of documents in a document database to obtain a plurality of clustered document sets and a corresponding plurality of category identifiers, and wherein acquiring the abstract information of content corresponding to the content category information comprises:

acquiring a first category identifier matching the content category information from the plurality of category identifiers; and acquiring abstract information of each document in a clustered document set corresponding to the first category identifier.

7. The server according to claim 6, wherein clustering the plurality of documents in the document database to obtain the plurality of clustered document sets and the corresponding plurality of category identifiers comprises:

performing respectively a semantic analysis on theme information of the plurality of documents in the document database to obtain a document tag set corresponding to the documents;

clustering all tags in the document tag set corresponding to the documents according to a first classification principle to obtain a tag classification result and the corresponding plurality of category identifiers; and classifying documents corresponding to the tags based on the tag classification result to obtain the plurality of clustered document sets corresponding to the plurality of category identifiers one to one.

8. The server according to claim 7, wherein the operations further comprises:

sorting the documents in the clustered document sets based on attribute information of each document in the clustered document sets to obtain a sorting result, wherein sending the abstract information to the sending end of the content acquisition request based on the identifier information comprises:

sorting the abstract information according to the sorting result to obtain sorted abstract information; and sending the sorted abstract information to the sending end of the content acquisition request based on the identifier information.

9. The server according to claim 6, wherein the operations further comprise:
determining, in response to receiving a read request for the abstract information, document content corresponding to the abstract information; and
sending the document content to the sending end of the content acquisition request.

10. The server according to claim 9, wherein the operations further comprise:
setting a virtual account for the sending end of the content acquisition request; and
recording, in the virtual account, an operation performed by the sending end of the content acquisition request.

11. A non-transitory computer readable storage medium, storing computer executable instructions, wherein the computer executable instructions, when executed by a computer, cause the computer to perform the method according to claim 1.

* * * * *